Oct. 9, 1923.
V. C. ANDERSON
1,470,372
BUCKSAW FRAME
Filed Oct. 14, 1922
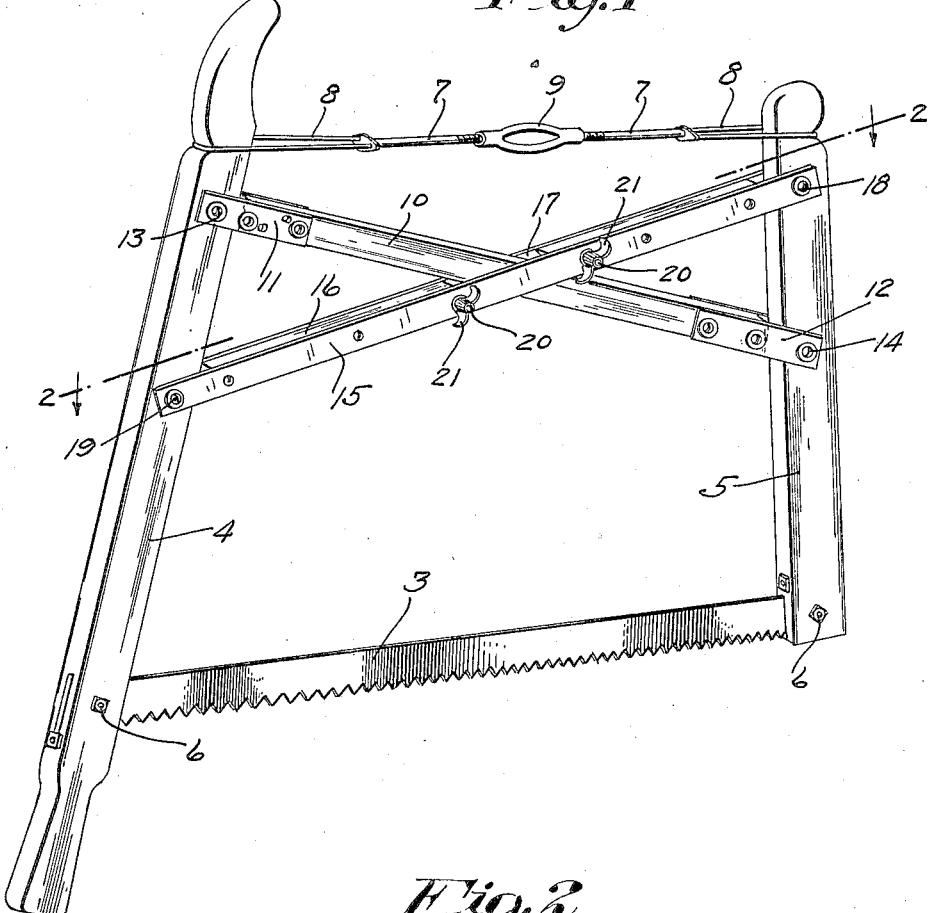
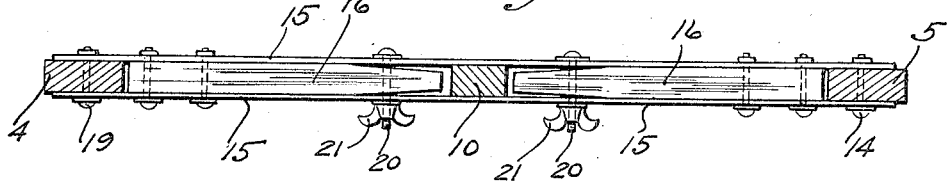
Inventor
Victor C. Anderson
By his Attorneys Patented Oct. 9, 1923.

1,470,372

UNITED STATES PATENT OFFICE.

VICTOR C. ANDERSON, OF MINNEAPOLIS, MINNESOTA.

BUCKSAW FRAME.

Application filed October 14, 1922. Serial No. 594,470.

*To all whom it may concern:*

Be it known that I, VICTOR C. ANDERSON, a citizen of the United States, residing at Minneapolis, in the county of Hennepin and State of Minnesota, have invented certain new and useful Improvements in Bucksaw Frames; and I do hereby declare the following to be a full, clear, and exact description of the invention, such as will enable others skilled in the art to which it appertains to make and use the same.

My invention provides an important improvement in bucksaw frames. Generally stated, the invention consists of the novel devices and combinations of devices hereinafter described and defined in the claims.

The invention resides chiefly in the novel relative arrangement of transversely crossed thrust bars in connection with the end bars of the saw frame. The invention is designated as a bucksaw frame, but it will, of course, be understood that the term "bucksaw frame" is used in a sense to include any kind of a saw frame wherein the saw blade is supported on the general frame of a bucksaw.

In the accompanying drawings, which illustrate the invention, like characters indicate like parts throughout the several views.

Referring to the drawings:

Fig. 1 is a perspective showing a bucksaw, the frame of which is designed in accordance with my invention; and Fig. 2 is an oblique transverse section taken on the line 2—2 of Fig. 1.

The saw blade 3 is connected to the frame end bars 4 and 5, preferably by bolts 6, in the customary way, and the upper ends of said end bars 4 and 5 are preferably connected by the customary tension link made up of rods 7, loops 8 and turnbuckle 9, which latter engages right and left threads of the rods 7. One of the oblique thrust bars is in the form of a wooden bar 10, preferably rectangular in cross-section and having bolted to its ends metallic straps 11 and 12. Such straps are arranged in laterally spaced pairs and the ends of the straps 11 embrace the end bar 4 and are pivotally connected thereto by a bolt 13 located but slightly below the underlying loop 8. The straps 12 embrace the end bar 5 and are pivotally connected thereto by a bolt 14 located at the intermediate portion of said end bar.

The other oblique thrust bar comprises long metal straps 15 and interposed wooden spacing strips 16. The central portions of the straps 15 embrace or straddle the central portion of the wooden bar 10 and the spacing strips 16 are spaced to form a gap 17 through which the bar 10 works with clearance. The upper ends of the straps 15 are pivotally connected to the end bar 5 by a bolt 18 located but slightly below the underlying loop 8 and the lower ends of said straps 15 are pivotally connected to the end bar 4 by a bolt 19 located at the intermediate portion of said bar 4. Clamping bolts 20, equipped with thumb nuts 21, are passed through the straps 15 not far from the inner ends of the spacing strips 16, and the inner ends of said spacing strips are preferably tapered so that when the nuts 21 are tightened, the central portions of the straps 15 will tightly clamp the central portion of the wooden bar 10.

When the turn-buckle 9 is turned in a direction to shorten the tension link, the saw blade 3 will, of course, be put under tension and, under this action, the pivots 14 and 19 act as the fulcrums over which the end bars 4 and 5 are rocked. The pivots 13 and 18, being located close to the points where the tension of the straining link is applied, afford bases of reaction. Otherwise stated, each thrust bar operates in a reverse direction and the one at an angle to the other, so that the two thrust bars afford a sort of a truss that makes the whole saw frame very rigid, both against movements in the plane of the saw frame and against tilting or lateral rocking movements. The described arrangement causes the two thrust bars to thrust in the same plane and in the plane of both end bars 4 and 5. In actual practice, it has been found that even when this saw frame is made light, it will be very rigid and that the saw blade may be put under high tension with very slight force applied to the turn-buckle 9. Not only is the frame described efficient, but is cheap to make, and is very strong and durable.

This improved saw frame has the further advantage that it is self-contained, even when the saw blade is removed. Otherwise stated, when the saw blade is removed, the thrust bars then become detached from the end bars, but hold the end bars in position and the tension link applied to the end bars, unless, of course, the latter be given very considerable slack, in which case it may be removed. Even if the saw blade and the tension link are removed, the end bars and thrust bars will remain properly connected.

What I claim is:

1. A bucksaw comprising end bars, a saw blade connected to the lower ends of said bars, an adjustable tension link connecting the upper ends of said end bars, and transversely intersecting thrust bars connecting said end bars between the saw blade and tension link, one of said thrust bars comprising metal straps embracing the intermediate portion of the other thrust bar and provided with nut-equipped bolts for clamping the intermediate portions of said straps onto the embraced portion of the intersecting thrust bar.

2. A bucksaw comprising end bars, a saw blade connected to the lower ends of said bars, an adjustable tension link connecting the upper ends of said end bars, and transversely intersecting thrust bars connecting said end bars between the saw blade and tension link, one of said thrust bars comprising metal straps embracing the intermediate portion of the other thrust bar and provided with nut-equipped bolts for clamping the intermediate portions of said straps onto the embraced portion of the intersecting thrust bar, the thrust bar having said straps also having longitudinally spaced wooden spacing strips.

3. A bucksaw comprising end bars, a saw blade connected to the lower ends of said end bars and a longitudinally adjustable tension link connecting the upper ends of said bars, and transversely intersecting thrust bars connecting said end bars between said saw blade and tension link, one of said thrust bars comprising laterally spaced metal straps embracing and pivotally connected to said end bars and having longitudinally spaced wooden spacing strips and nut-equipped clamping bolts applied through said straps near the inner ends of said spacing strips, and the other of said thrust bars comprising a wooden body member passed between the central portions of said metal straps and between the inner ends of said spacing strips, said wooden bar member at its ends having radially secured metal straps that embrace and are pivotally connected to said end bars.

In testimony whereof I affix my signature.

VICTOR C. ANDERSON.